United States Patent
Shinoda et al.

(10) Patent No.: US 10,481,590 B2
(45) Date of Patent: Nov. 19, 2019

(54) CONTROL SYSTEM OF MACHINE TOOL

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/928,163

(22) Filed: Mar. 22, 2018

(65) Prior Publication Data

US 2018/0275639 A1  Sep. 27, 2018

(30) Foreign Application Priority Data

Mar. 27, 2017  (JP) .................................. 2017-061410

(51) Int. Cl.
*G05B 19/416* (2006.01)
*B23Q 15/12* (2006.01)
(Continued)

(52) U.S. Cl.
CPC .......... *G05B 19/416* (2013.01); *B23Q 15/08* (2013.01); *B23Q 15/12* (2013.01); *B23Q 15/14* (2013.01);
(Continued)

(58) Field of Classification Search
CPC .............. G05B 19/416; G05B 19/404; G05B 2219/49176; G05B 2219/37347;
(Continued)

(56) References Cited

U.S. PATENT DOCUMENTS

| | | | |
|---|---|---|---|
| 5,768,137 A | 6/1998 | Polidoro et al. | |
| 5,871,391 A * | 2/1999 | Pryor ........................ | F02F 1/24 356/600 |

(Continued)

FOREIGN PATENT DOCUMENTS

| | | |
|---|---|---|
| CN | 101722438 A | 6/2010 |
| CN | 101813931 A | 8/2010 |

(Continued)

OTHER PUBLICATIONS

An Office Action mailed by the State Intellectual Property Office of the People's Republic of China dated Apr. 2, 2019, which corresponds to Chinese Patent Application No. 201810241571.2 and is related to U.S. Appl. No. 15/928,163.

(Continued)

*Primary Examiner* — Sean Shechtman
(74) *Attorney, Agent, or Firm* — Studebaker & Brackett PC (57) ABSTRACT

A numerical control system of a machine tool includes an analysis device. The analysis device includes acquisition portions which acquire chronological speed control data when the work is machined and which acquire spatial machined surface measurement data after the machining of the work, a data-associating processing portion which associates the speed control data and the machined surface measurement data with each other, a machined surface failure detection portion which detects failures on the machined surface of the work, an identification portion which identifies the speed control data of failure locations corresponding to the machined surface measurement data of the failure locations, a failure interval detection portion which detects the interval of the failures and a calculation portion which calculates the frequency of vibrations based (Continued)

on a machining speed based on the speed control data of the failure locations and the interval of the failures.

9 Claims, 7 Drawing Sheets

(51) Int. Cl.
    *B23Q 15/14*     (2006.01)
    *B23Q 15/08*     (2006.01)
    *G05B 19/404*     (2006.01)

(52) U.S. Cl.
    CPC ........ *G05B 19/404* (2013.01); *B23Q 2717/00* (2013.01); *G05B 2219/34294* (2013.01); *G05B 2219/37206* (2013.01); *G05B 2219/37347* (2013.01); *G05B 2219/49098* (2013.01); *G05B 2219/49176* (2013.01)

(58) Field of Classification Search
    CPC ........... G05B 2219/37206; G05B 2219/49098; G05B 2219/34294; B23Q 15/08; B23Q 15/14; B23Q 15/12; B23Q 2717/00
    See application file for complete search history.

(56) References Cited

U.S. PATENT DOCUMENTS

| | | |
|---|---|---|
| 6,449,526 B1 | 9/2002 | Sachs et al. |
| 2001/0024097 A1 | 9/2001 | Kunugi et al. |
| 2010/0057257 A1 | 3/2010 | Ichikawa |
| 2014/0087628 A1 | 3/2014 | Bharadwaj |
| 2014/0157610 A1 | 6/2014 | Garvey et al. |
| 2016/0054724 A1 | 2/2016 | Oda |
| 2017/0300034 A1* | 10/2017 | Nagaoka .............. G05B 19/406 |
| 2018/0267505 A1 | 9/2018 | Shinoda et al. |
| 2018/0275639 A1 | 9/2018 | Shinoda et al. |
| 2018/0307202 A1 | 10/2018 | Ikai et al. |

FOREIGN PATENT DOCUMENTS

| | | |
|---|---|---|
| CN | 101984379 A | 3/2011 |
| CN | 102029546 A | 4/2011 |
| CN | 103029131 A | 4/2013 |
| CN | 104889829 A | 9/2015 |
| CN | 105404236 A | 3/2016 |
| CN | 106325209 A | 1/2017 |
| DE | 102015119240 B3 | 3/2017 |
| JP | 2006-255826 A | 9/2006 |
| JP | 2007-190628 A | 8/2007 |
| JP | 2010-054399 A | 3/2010 |
| JP | 2010-262474 A | 11/2010 |
| JP | 2011-095879 A | 5/2011 |
| JP | 2014-010687 A | 1/2014 |
| JP | 2014-164597 A | 9/2014 |
| JP | 2016-057843 A | 4/2016 |
| JP | 2016-078150 A | 5/2016 |
| JP | 2016-140899 A | 8/2016 |
| JP | 2017-013178 A | 1/2017 |
| JP | 2017-054463 A | 3/2017 |

OTHER PUBLICATIONS

An Office Action mailed by the Japanese Patent Office dated Sep. 25, 2018, which corresponds to Japanese Patent Application No. 2017-048903 and is related to U.S. Appl. No. 15/928,163.

An Office Action mailed by the United States Patent and Trademark Office dated Jun. 20, 2019, which corresponds to U.S. Appl. No. 15/952,487 and is related to U.S. Appl. No. 15/928,163.

An Office Action mailed by the State Intellectual Property Office of the People's Republic of China dated Jun. 3, 2019, which corresponds to Chinese Patent Application No. 201810200632.0 and is related to U.S. Appl. No. 15/928,163.

An Office Action mailed by the United States Patent and Trademark Office dated Jul. 31, 2019, which corresponds to U.S. Appl. No. 15/914,699 and is related to U.S. Appl. No. 15/928,163.

An Office Action mailed by the State Intellectual Property Office of the People's Republic of China dated Aug. 15, 2019, which corresponds to Chinese Patent Application No. 201810325683.6 and is related to U.S. Appl. No. 15/928,163; with partial English translation.

An Office Action issued by the German Patent Office dated Sep. 24, 2019, which corresponds to German Patent Application No. 102018002303.7 and is related to U.S. Appl. No. 15/928,163; with partial English language translation.

* cited by examiner

CONTROL SYSTEM OF MACHINE TOOL

This application is based on and claims the benefit of priority from Japanese Patent Application No. 2017-061410, filed on 27 Mar. 2017, the content of which is incorporated herein by reference.

BACKGROUND OF THE INVENTION

Field of the Invention

The present invention relates to the control system of a machine tool which machines a work.

Related Art

A machine tool machines a work while moving at least one of the work (the item to be machined) and a tool along predetermined drive axes. In other words, the machine tool machines the work while varying a relative position of the work and the tool.

When the work is machined, vibrations may be transmitted to a main axis head which holds a tool or a table which holds the work such that the tool or the work is vibrated. For example, vibrations are produced when the direction of movement of the main axis head or the table is switched at the time of the machining. Vibrations are also transmitted from a fan motor in an inverter or the like within the machine tool, various machines outside the machine tool, or the like. When the tool or the work is vibrated by the vibrations described above, a stripe pattern (failures) may occur on the machined surface of the work. In other words, streaks or stripes may occur at a predetermined interval.

Patent Documents 1 and 2 disclose technologies in which based on the movement path of the tip end of a tool when a work is machined, a stripe pattern (failures) on the machined surface of the work is detected.

Patent Document 1: Japanese Unexamined Patent Application, Publication No. 2016-57843

Patent Document 2: Japanese Unexamined Patent Application, Publication No. 2017-13178

SUMMARY OF THE INVENTION

The inventors et al. of the present application have attempted an approach different from the technologies disclosed in Patent Documents 1 and 2 in order to detect failures on the machined surface of a work. Specifically, as another method of detecting the failures on the machined surface of the work, after the machining of the work, a vision sensor or the like is used to sense an image of the machined surface of the work, image processing is performed on the data of the sensed image and thus the failures (streaks or stripes) on the machined surface are detected. Then, the frequency of vibrations that cause the failures is estimated from the interval of the failures detected from the image data.

However, a machining speed may vary while the work is being machined. In this case, the interval of the failures (streaks or stripes) is varied, and thus it is difficult to estimate the frequency of the vibrations that cause the failures.

Hence, the present invention has an object to provide the control system of a machine tool that can estimate the frequency of vibrations that cause failures on the machined surface of a work in machining where machining speed varies while the work is being machined.

(1) A control system (for example, a numerical control system 100 of a machine tool which will be described later) of a machine tool according to the present invention which machines a work (for example, a work W which will be described later) includes: a control device (for example, a numerical control device 17 which will be described later) which controls a drive axis of the machine tool (for example, a machine tool 10 which will be described later) based on speed control data; a machined surface measurement device (for example, a machined surface measurement device 20 which will be described later) which measures a machined surface of the work; and an analysis device (for example, a machined surface failure analysis device 30 which will be described later) which analyzes failures on the machined surface of the work, where the analysis device includes: a first acquisition portion (for example, a drive axis control data acquisition portion 31 which will be described later) which acquires, from the control device, the chronological speed control data when the work is machined; a second acquisition portion (for example, a machined surface measurement data acquisition portion 32 which will be described later) which acquires spatial machined surface measurement data after the machining of the work measured by the machined surface measurement device; a data-associating processing portion (for example, a data-associating processing portion 34 which will be described later) which associates the chronological speed control data acquired by the first acquisition portion and the spatial machined surface measurement data acquired by the second acquisition portion with each other; a machined surface failure detection portion (for example, a machined surface failure detection portion 35 which will be described later) which detects the failures on the machined surface of the work and the locations thereof based on the spatial machined surface measurement data acquired by the second acquisition portion; an identification portion (for example, a failure location control data identification portion 36 which will be described later) which identifies, based on the speed control data and the machined surface measurement data associated by the data-associating processing portion, the speed control data of the failure locations corresponding to the machined surface measurement data of the failure locations detected by the machined surface failure detection portion; a failure interval detection portion (for example, a failure interval detection portion 37 which will be described later) which detects an interval of the failures detected by the machined surface failure detection portion; and a calculation portion (for example, a vibration frequency calculation portion 38 which will be described later) which determines a speed in a direction of the machining based on the speed control data of the failure locations identified by the identification portion and which calculates, based on the determined speed and the interval of the failures detected by the failure interval detection portion, the frequency of vibrations of the machine tool that cause the failures.

(2) In the control system of the machine tool according to (1), the data-associating processing portion: may detect, based on a variation in the chronological speed control data, as an edge position of the work, a machining start position and a machining completion position so as to produce a first work shape image; may detect, based on the spatial machined surface measurement data, an edge position of the work so as to produce a second work shape image; and may associate the chronological speed control data and the spatial machined surface measurement data with each other so as to superimpose the edge position of the first work shape image and the edge position of the second work shape image on each other.

(3) In the control system of the machine tool according to (1), the data-associating processing portion: may detect, based on a variation in a value obtained by subtracting an acceleration/deceleration variation part from the chronological speed control data, as an edge position of the work, a machining start position and a machining completion position so as to produce a first work shape image; may detect, based on the spatial machined surface measurement data, an edge position of the work so as to produce a second work shape image; and may associate the chronological speed control data and the spatial machined surface measurement data with each other so as to superimpose the edge position of the first work shape image and the edge position of the second work shape image on each other.

(4) In the control system of the machine tool according to (1), the first acquisition portion may acquire, from the control device, position information of the drive axis of the machine tool which is chronological position control data associated with the chronological speed control data when the work is machined, and the data-associating processing portion: may produce a first work shape image based on the chronological position control data; may produce a second work shape image based on the spatial machined surface measurement data; may associate the chronological position control data and the spatial machined surface measurement data with each other so as to superimpose the first work shape image and the second work shape image on each other; and may associate the chronological speed control data and the chronological position control data with each other so as to associate the chronological speed control data and the spatial machined surface measurement data with each other.

(5) In the control system of the machine tool according to (4), the chronological position control data may be machine coordinate information, and the spatial machined surface measurement data may be machine coordinate information which is calculated based on a machine coordinate of the machined surface measurement device.

(6) In the control system of the machine tool according to any one of (1) to (5), the analysis device may further include an adjustment portion (for example, an adjustment portion 39 which will be described later) which adjusts, based on the frequency of the vibrations calculated in the calculation portion, a filter or a machining condition of the control device so as to reduce the vibrations.

(7) In the control system of the machine tool according to (6), the adjustment portion may adjust a characteristic of the filter in a control loop of the control device or may set the filter in the control loop of the control device.

(8) In the control system of the machine tool according to (6), the adjustment portion may adjust a parameter for determining a speed, an acceleration or a jerk of the drive axis in the control device so as to adjust the machining condition.

(9) In the control system of the machine tool according to any one of (1) to (8), the failures on the machined surface of the work may be streaks or stripes.

(10) In the control system of the machine tool according to any one of (1) to (9), the speed control data may be a speed command value or a speed feedback value.

According to the present invention, it is possible to provide the control system of a machine tool that can estimate the frequency of vibrations that cause failures on the machined surface of a work in machining where machining speed varies while the work is being machined.

DETAILED DESCRIPTION OF THE INVENTION

Examples of the embodiment of the present invention will be described below with reference to accompanying drawings. In the drawings, the same or corresponding portions are identified with the same symbols.

(Machine Tool)

Figure 1:
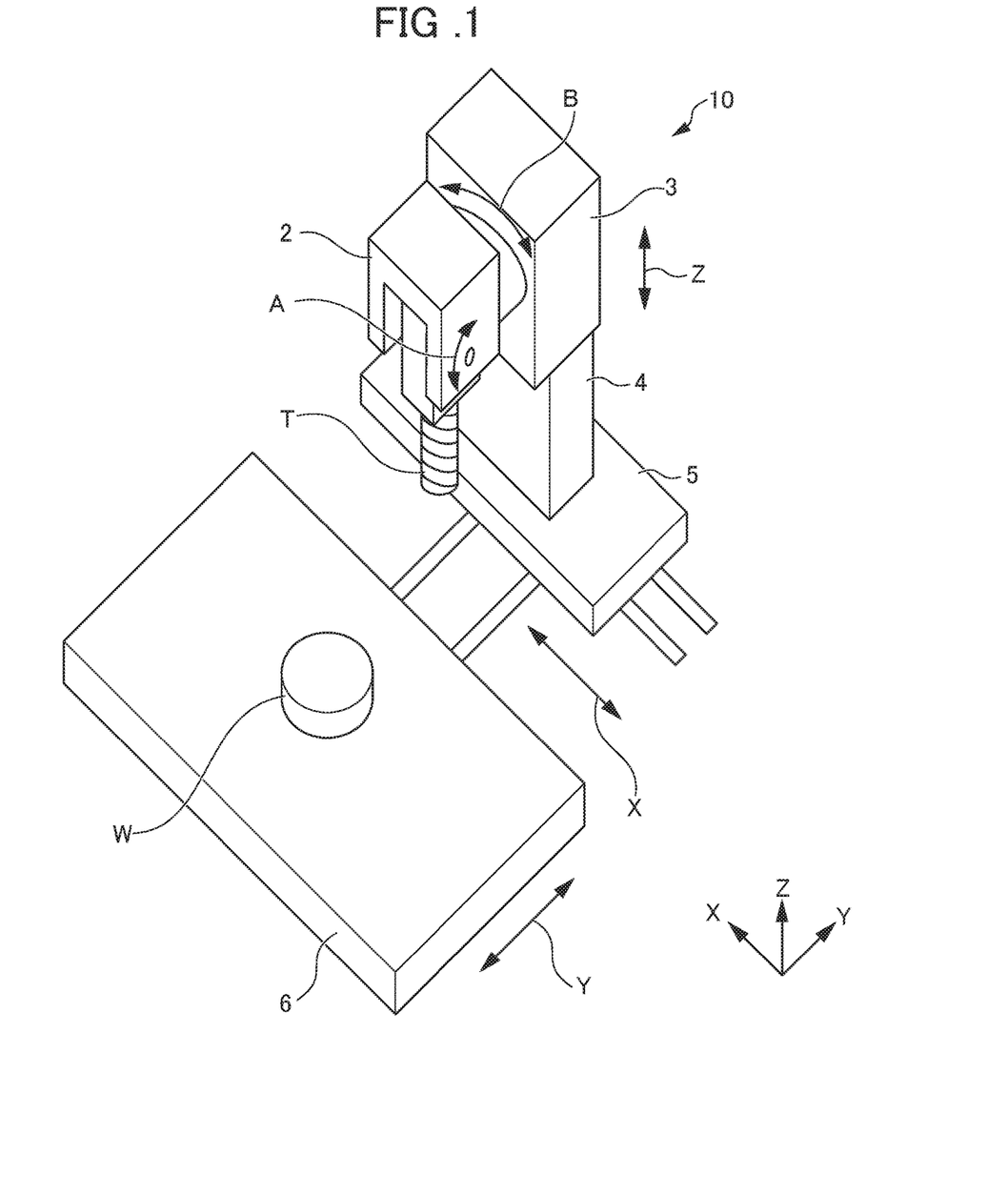
FIG. 1 is a perspective view showing an example of the configuration of a machine tool according to the present embodiment of the present invention.

An example of a machine tool in a numerical control system according to the embodiment of the present invention will first be described. FIG. 1 is a perspective view showing an example of the configuration of the machine tool according to the present embodiment of the present invention. This machine tool 10 is a machine tool which performs machining (cutting). The machine tool in the numerical control system of the present invention is not limited to this machine tool, and may be an arbitrary industrial machine.

The machine tool 10 shown in FIG. 1 includes a head 2, a support member 3 which movably supports the head 2, a support column 4 which movably supports the support member 3, a base 5 which supports the support column 4, and a table 6. A tool T such as an end mill is fitted to the head 2, and a work W is mounted on the table 6. The machine tool 10 includes a drive device (unillustrated) and a numerical control device (unillustrated).

The drive device includes servomotors which will be described later. The drive device moves the base 5 in the direction of an X axis (arrow X), moves the table 6 in the direction of a Y axis (arrow Y) and moves the support member 3 in the direction of a Z axis (arrow Z). Furthermore, the drive device turns the tool T in the direction of an A axis (arrow A) with respect to the head 2, and turns the head 2 in the direction of a B axis (arrow B) with respect to the support member 3.

The numerical control device controls the drive device so as to control drive axes formed with the three directly moved axes (the X axis, the Y axis, and the Z axis) and the two rotation axes (the A axis and the B axis), and thereby controls the relative position of the tool T with respect to the work W and the posture thereof. In this way, the machine tool 10 machines the work W while changing the relative position of the tool T with respect to the work W and the posture thereof.

In the machine tool 10 described above, when the work W is machined, vibrations may be transmitted to the head 2 which holds the tool T or the table 6 which holds the work W such that the tool T or the work W is vibrated. For example, vibrations are produced when the direction of movement of the head 2 or the table 6 is switched at the time of the machining. When the tool T or the work W is vibrated by the vibrations of the machine tool 10 described above, failures (streaks or stripes) may occur on the machined surface of the work W.

The failures (streaks or stripes) described above can be detected by using a vision sensor or the like after the machining of the work W so as to sense an image of the machined surface of the work W and perform image processing on the data of the sensed image. Then, the frequency of the vibrations of the machine tool 10 that cause the failures can be estimated from the interval of the failures detected from the image data.

However, a machining speed may vary while the work W is being machined. In this case, the interval of the failures (streaks or stripes) is varied, and thus it is difficult to estimate the frequency of the vibrations of the machine tool 10 that cause the failures.

The present invention relates to the numerical control system of the machine tool that can estimate the frequency of the vibrations of the machine tool 10 that cause the failures on the machined surface of the work W even in machining where machining speed varies while the work is being machined.

(Numerical Control System of Machine Tool)

Figure 2:
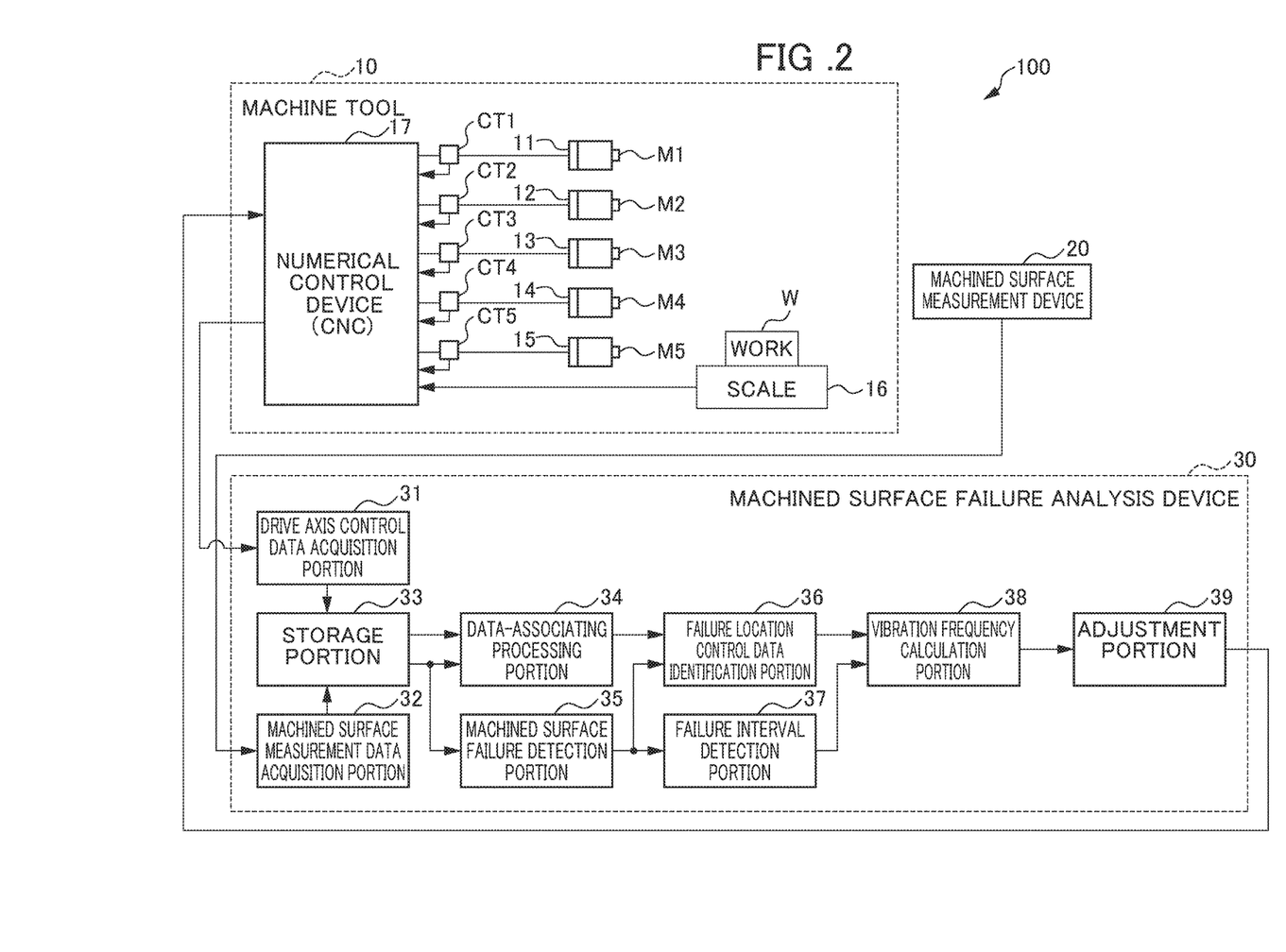
FIG. 2 is a diagram showing the configuration of a numerical control system in the machine tool according to the embodiment of the present invention.

Next, the numerical control system of the machine tool according to the embodiment of the present invention will be described. FIG. 2 is a diagram showing the configuration of the numerical control system in the machine tool according to the embodiment of the present invention. The numerical control system 100 of the machine tool shown in FIG. 2 includes the machine tool 10 described above, a machined surface measurement device 20 and a machined surface failure analysis device 30.

The machine tool 10 includes a plurality of servomotors M1 to M5 in the drive device described above, encoders (position/speed detectors) 11 to 15 which are respectively provided in the servomotors M1 to M5, current detectors CT1 to CT5, a scale (position detector) 16 and the numerical control device (CNC) 17. In FIG. 2, only the configuration of the machine tool 10 which is related to the characteristics of the present invention is shown, and other configurations are omitted.

The servomotors M1 to M5 respectively drive the drive axes (the X axis, the Y axis, the Z axis, the A axis and the B axis) described above by the control of the numerical control device 17. The encoders 11 to 15 respectively detect the rotation positions of the servomotors M1 to M5, and transmit the detected rotation positions to the numerical control device 17 as position feedback values. The encoders 11 to 15 respectively detect the rotation speeds of the servomotors M1 to M5, and transmit the detected rotation speeds to the numerical control device 17 as speed feedback values.

The current detectors CT1 to CT5 respectively detect the drive current values of the servomotors M1 to M5, and transmit the detected drive current values to the numerical control device 17 as current feedback values (actual current values, actual torque values).

For example, a scale 16 is provided in the table 6 on which the work W described above is mounted. The scale 16 detects the position of the work, and transmits the detected position to the numerical control device 17 as a position feedback value.

The numerical control device 17 generates torque command values (current command values) for the drive axes based on position command values (movement command values) of the drive axes based on a machining program related to the machining of the work W, the position feedback value from the scale 16 or the position feedback values from the encoders 11 to 15, the speed feedback values from the encoders 11 to 15, and the current feedback values from the current detectors CT1 to CT5, and drives the servomotors M1 to M5 with these torque command values.

Specifically, the numerical control device 17 includes a position command generation portion, a speed command generation portion and a torque command generation portion. The position command generation portion generates, based on the machining program stored in a storage portion, the position command values (movement command values) for the drive axes. The speed command generation portion generates speed command values for the drive axes based on differences between the position command values and the position feedback values. The torque command generation portion generates the torque command values (current command values) based on differences between the speed command values and the speed feedback values. The numerical control device 17 generates the drive currents for the drive axes based on differences between the torque command values (current command values) and the current feedback values.

The numerical control device 17 is formed with, for example, a computation processor such as a DSP (Digital Signal Processor) or an FPGA (Field-Programmable Gate Array). The various types of functions of the numerical control device 17 are realized by executing predetermined software (programs, applications) stored in the storage portion (unillustrated). The various types of functions of the numerical control device 17 may be realized by the cooperation of hardware and software or may be realized only by hardware (electronic circuit).

The machined surface measurement device 20 is a device which measures the work W so as to measure the machined surface of the work W. Specific examples of the machined surface measurement device 20 include a vision sensor, an optical microscope, a laser microscope or a three-dimensional coordinate measurement machine. The machined surface measurement device 20 transmits the image data or the position data of the work W measured to the machined surface failure analysis device 30. The machined surface measurement device 20 is provided in, for example, a measurement stage or a fixing stage outside the machine tool 10, or an end factor of a robot. The machined surface measurement device 20 may be incorporated into the machine tool 10.

The machined surface failure analysis device 30 is a device which analyzes the failures (streaks or stripes) on the machined surface of the work W. Specifically, the machined surface failure analysis device 30 estimates the frequency of vibrations that cause the failures (streaks or stripes). The machined surface failure analysis device 30 includes a drive axis control data acquisition portion (first acquisition portion) 31, a machined surface measurement data acquisition portion (second acquisition portion) 32, a storage portion 33, a data-associating processing portion 34, a machined surface failure detection portion 35, a failure location control data identification portion 36, a failure interval detection portion 37, a vibration frequency calculation portion 38 and an adjustment portion (setting portion) 39.

The drive axis control data acquisition portion 31 acquires, from the numerical control device 17, the chronological drive axis control data when the work W is machined. Specifically, the drive axis control data acquisition portion 31 acquires, as the drive axis control data, speed control data (speed command values or speed feedback values detected by the encoders 11 to 15).

The machined surface measurement data acquisition portion 32 acquires the spatial machined surface measurement data after the machining of the work W measured on the machined surface measurement device 20. Specifically, the machined surface measurement data acquisition portion 32 acquires, as the machined surface measurement data, the three-dimensional image data or the position data (coordinate data). The machined surface measurement data acquisition portion 32 may acquire, as the machined surface measurement data, two-dimensional image data.

The storage portion 33 stores the chronological speed control data acquired by the drive axis control data acquisition portion 31 and the spatial machined surface measurement data measured by the machined surface measurement device 20. The storage portion 33 is, for example, a rewritable memory such as an EEPROM.

The data-associating processing portion 34 associates the chronological speed control data and the spatial machined surface measurement data stored in the storage portion 33 with each other. The details of the data-associating processing will be described later.

The machined surface failure detection portion 35 detects, based on the spatial machined surface measurement data stored in the storage portion 33, the failures (streaks or stripes) of the machined surface of the work W and the locations thereof.

The failure location control data identification portion 36 identifies, based on the speed control data and the machined surface measurement data associated with each other by the data-associating processing portion 34, the speed control data of the failure locations corresponding to the machined surface measurement data of the failure locations detected by the machined surface failure detection portion 35. The failure location control data identification portion 36 also associates the direction of the machined surface failures (streaks or stripes) and the direction of machining based on the chronological speed control data of the failure locations with each other.

The failure interval detection portion 37 detects the interval of the failures (streaks or stripes) detected by the machined surface failure detection portion 35.

The vibration frequency calculation portion 38 determines a speed in the direction of the machining based on the speed control data of the failure locations identified by the failure location control data identification portion 36. Then, the vibration frequency calculation portion 38 calculates, based on the determined speed v and the interval d of the failures (streaks or stripes) detected by the failure interval detection portion 37, by formula (1) below, the frequency f of the vibrations of the machine tool 10 that cause the failures.

$$f = v/d \qquad (1)$$

The adjustment portion 39 adjusts, based on the frequency of the vibrations calculated by the vibration frequency calculation portion 38, the filter or the machining condition of the numerical control device 17 so as to reduce the vibrations. For example, the adjustment portion 39 adjusts the filter (for example, a low-pass filter, a high-pass filter or a band-pass filter) characteristic or the gain of a control loop formed with the position command generation portion, the speed command generation portion, and the torque command generation portion in the numerical control device 17. Alternatively, the adjustment portion 39 sets a filter (for example, a notch filter or a band stop filter) in the control loop of the numerical control device 17. Alternatively, the adjustment portion 39 adjusts the machining condition (the speed, the acceleration or the jerk) of the numerical control device 17. The details of adjustment processing by the adjustment portion 39 will be described later.

Here, the failures (streaks or stripes) caused by the vibrations occur in a direction intersecting the direction of the machining. Thus, the adjustment portion 39 performs, based on the direction of the machined surface failures (streaks or stripes) and the direction of the machining associated by the failure location control data identification portion 36, the adjustment processing when the direction of the machined surface failures (streaks or stripes) intersects the direction of the machining.

The machined surface failure analysis device 30 is formed with, for example, a computation processor such as a DSP (Digital Signal Processor) or an FPGA (Field-Programmable Gate Array). The various types of functions of the machined surface failure analysis device 30 are realized by executing predetermined software (programs, applications) stored in the storage portion (unillustrated). The various types of functions of the machined surface failure analysis device 30 may be realized by the cooperation of hardware and software or may be realized only by hardware (electronic circuit).

The various types of functions of the machined surface failure analysis device 30 may be realized in the numerical control device 17 of the machine tool 10.

Figure 3:
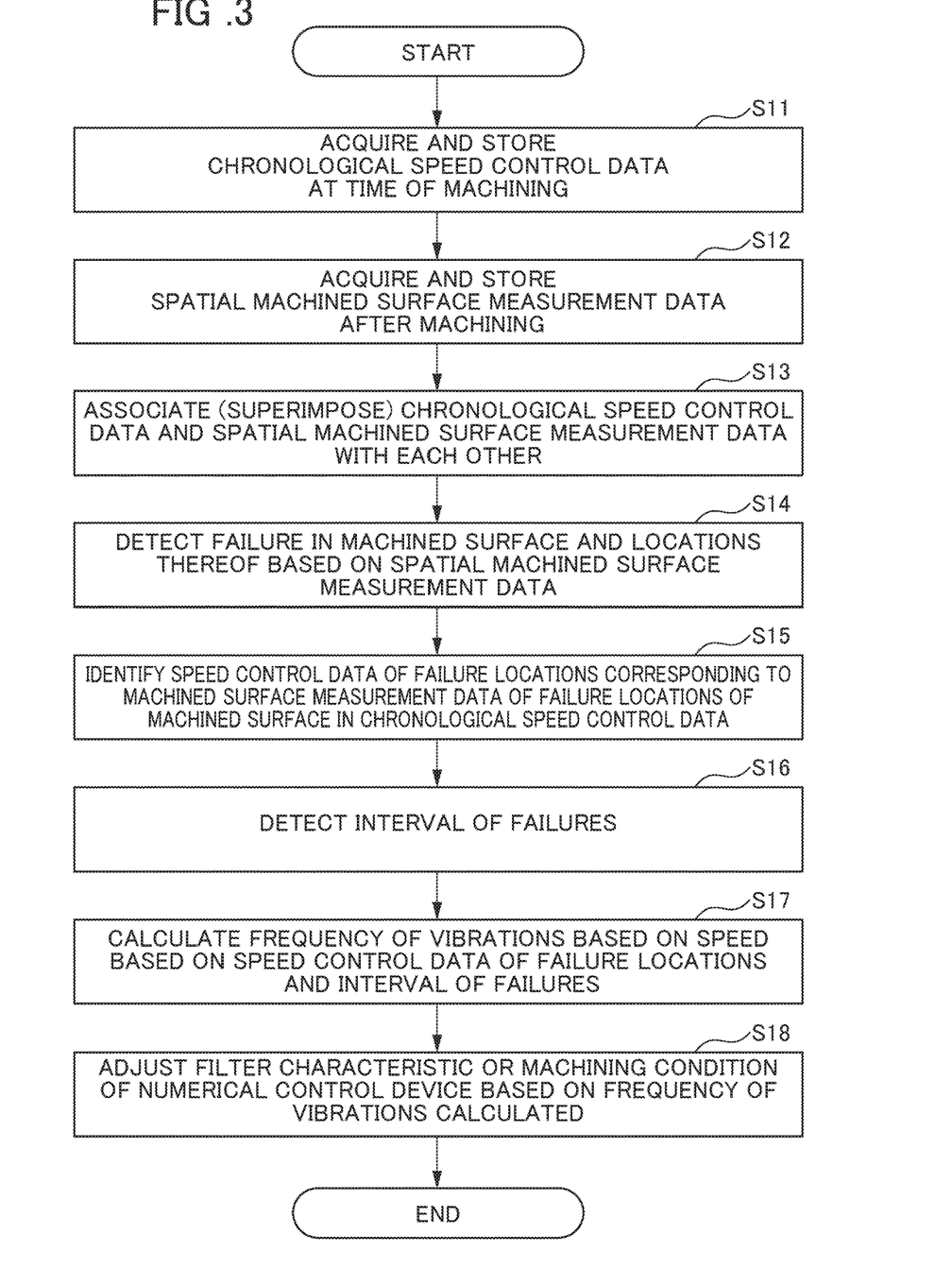
FIG. 3 is a flowchart showing machined surface failure analysis processing performed by the machined surface failure analysis device of the numerical control system in the machine tool according to the embodiment of the present invention.
Figure 4:
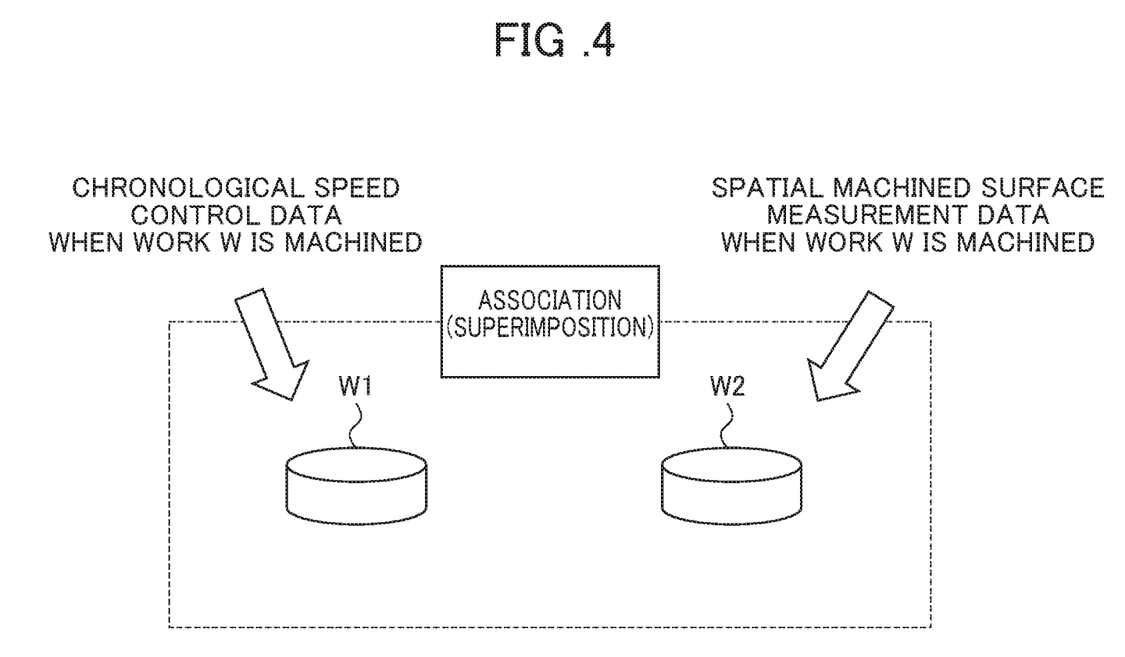
FIG. 4 is a diagram schematically showing data-associating processing.
Figure 5:
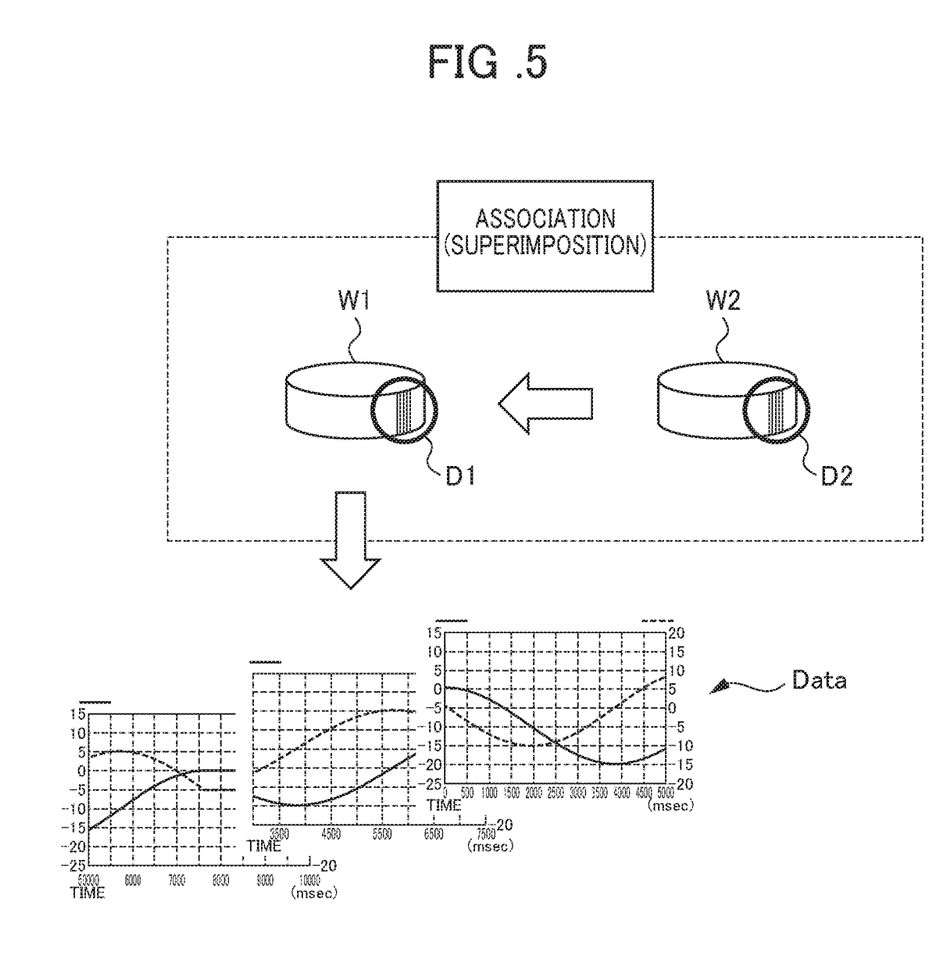
FIG. 5 is a diagram schematically showing identification processing on the control data of the location of failures.
Figure 6A:
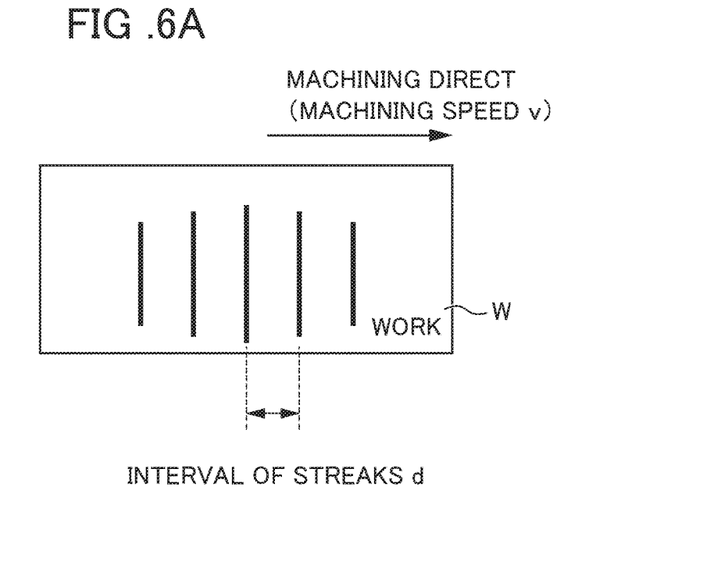
FIG. 6A is a schematic view showing failures (streaks or stripes) when the work is seen in a direction perpendicular to the machined surface.
Figure 6B:
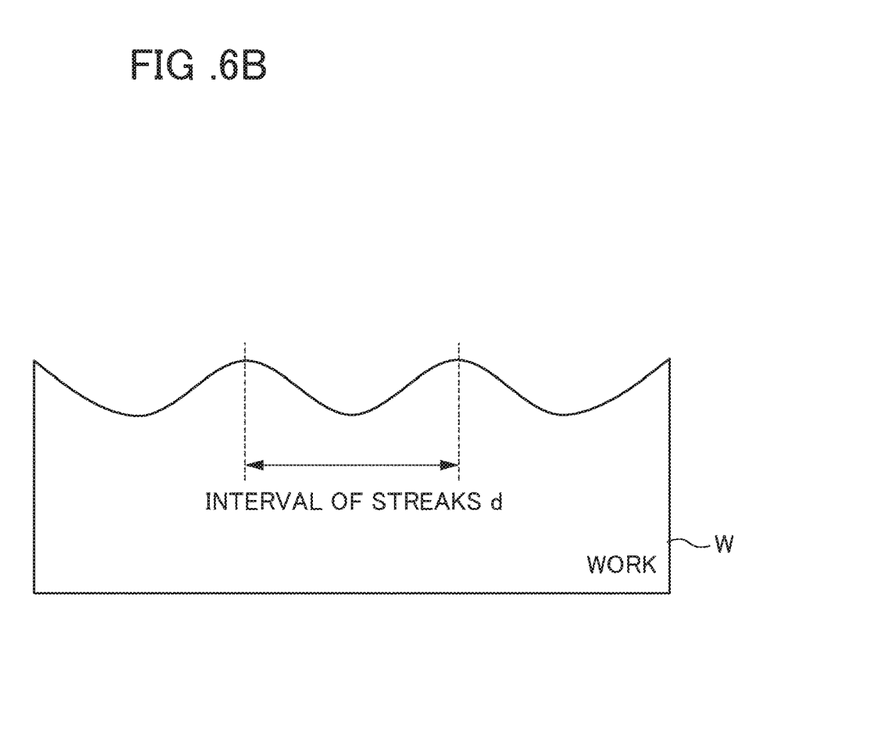
FIG. 6B is a schematic view showing the failures (streaks or stripes) when the work is seen in a direction parallel to the machined surface.
Figure 7A:
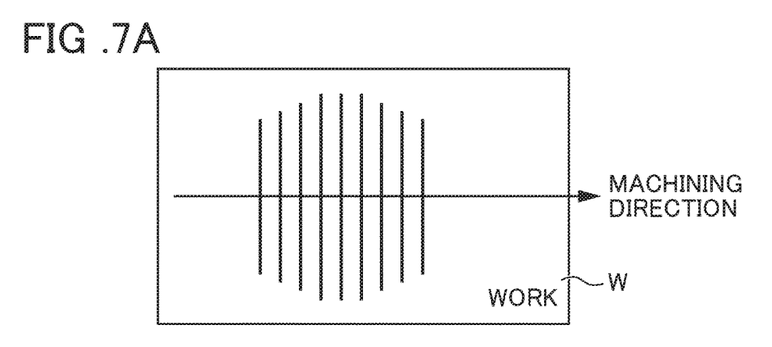
FIG. 7A is a schematic view showing an example of the failures (streaks or stripes) when the work is seen in the direction perpendicular to the machined surface.
Figure 7B:
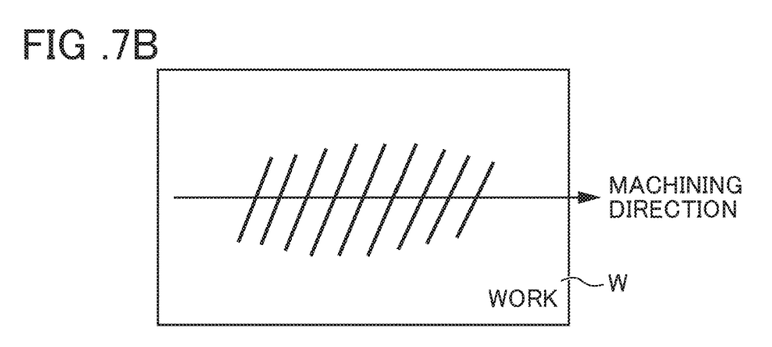
FIG. 7B is a schematic view showing another example of the failures (streaks or stripes) when the work is seen in the direction perpendicular to the machined surface.
Figure 7C:
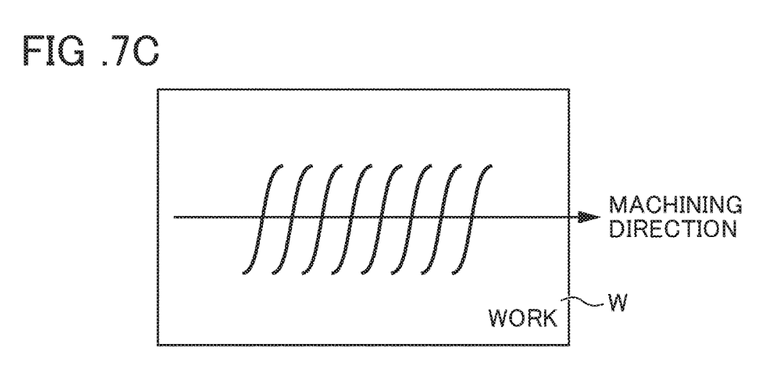
FIG. 7C is a schematic view showing yet another example of the failures (streaks or stripes) when the work is seen in the direction perpendicular to the machined surface.

Next, the machined surface failure analysis processing performed by the machined surface failure analysis device 30 of the numerical control system 100 in the machine tool according to the present embodiment will be described with reference to FIGS. 3 to 7C. FIG. 3 is a flowchart showing the machined surface failure analysis processing performed by the machined surface failure analysis device 30 of the numerical control system 100 in the machine tool according to the present embodiment. FIG. 4 is a diagram schematically showing the data-associating processing. FIG. 5 is a diagram schematically showing identification processing on the control data of the failure locations. FIG. 6A is a schematic view showing the failures (streaks or stripes) when the work W is seen in a direction perpendicular to the machined surface, and FIG. 6B is a schematic view showing the failures (streaks or stripes) when the work W is seen in a direction parallel to the machined surface. FIGS. 7A to 7C are schematic views showing some examples of the failures (streaks or stripes) when the work W is seen in the direction perpendicular to the machined surface.

When the work W is machined by the machine tool 10, the numerical control device 17 controls the drive axes based on the position command values, the speed command values, and the torque command values (current command values) of the drive axes, the position feedback values from the scale 16 (or the position feedback values from the encoders 11 to 15), the speed feedback values from the encoders 11 to 15, and the current feedback values (actual current values and actual torque values) from the current detectors CT1 to CT5, and thereby controls the relative position of the tool T with respect to the work W and the posture thereof.

When the work W is machined, in step S11, the drive axis control data acquisition portion 31 acquires the chronological speed control data (speed command values or speed feedback values detected by the encoders 11 to 15) from the numerical control device 17, and stores it in the storage portion 33.

When the machining of the work W is completed, the machined surface measurement device 20 measures the machined surface of the work W. Here, in step S12, the machined surface measurement data acquisition portion 32 acquires the spatial machined surface measurement data from the machined surface measurement device 20, and stores it in the storage portion 33. Specifically, the machined surface measurement data acquisition portion 32 acquires, as the machined surface measurement data, the three-dimensional image data or the position data (coordinate data).

Then, in step S13, the data-associating processing portion 34 associates the chronological speed control data and the spatial machined surface measurement data stored in the storage portion 33 with each other. Here, after the machining of the work, for example, the data of an image sensed by a vision sensor is three-dimensional data whereas the speed control data obtained from the numerical control device 17 when the work W is machined is chronological data, with the result that it is not easy to associate these types of data with each other. The inventors et al. of the present application use the following method in order to associate these types of data with each other.

For example, the machine tool machines the entire work W while reciprocating the tool T with respect to the work W. Here, when the tool T makes contact with the work W and when the tool T is separated from the work W, the speed command values and the speed feedback values are varied. In this way, the point of a variation in the speed command values or the point of a variation in the speed feedback values is detected, and thus it is possible to detect the edge position of the work W, that is, the outline of the work W.

Since the speed command values and the speed feedback values are also varied according to acceleration/deceleration, in the present embodiment, a value obtained by subtracting an acceleration/deceleration variation part from the speed command values and the speed feedback values is used. In this way, a return point when the tool T is reciprocated with respect to the work W is prevented from being erroneously detected as the edge position of the work W. When the tool T is not reciprocated with respect to the work W, the speed command values and the speed feedback values may be used without being processed.

Specifically, the data-associating processing portion 34 detects, based on the point of a variation in the value obtained by subtracting the acceleration/deceleration variation part from the chronological speed control data, as the edge position of the work W, a machining start position and a machining completion position, and thereby produces a first work shape (outline) image W1 as shown in FIG. 4.

The data-associating processing portion 34 also detects, based on the spatial machined surface measurement data after the machining of the work W, the edge position of the work, and thereby produces a second work shape (outline) image W2 as shown in FIG. 4. For example, when the machined surface measurement device 20 is a vision sensor, the machined surface measurement data is image data. In this case, the data-associating processing portion 34 uses an image processing technology so as to detect the edge position of the work W from the image data and produce the second work shape (outline) image W2.

On the other hand, when the machined surface measurement device 20 is an optical microscope, a laser microscope or a three-dimensional coordinate measurement machine, the machined surface measurement data is position data (coordinate data). In this case, the data-associating processing portion 34 detects the edge position of the work W from the position data (coordinate data), and produces the second work shape (outline) image W2.

Then, the data-associating processing portion 34 associates the chronological speed feedback values and the spatial machined surface measurement data of the machined surface with each other so as to superimpose the first work shape image W1 and the second work shape image W2 on each other.

Then, in step S14, the machined surface failure detection portion 35 detects, based on the spatial machined surface measurement data stored in the storage portion 33, the failures (streaks or stripes) on the machined surface of the work W and the locations thereof. Specifically, when the machined surface measurement device 20 is a vision sensor, the machined surface measurement data is image data. In this case, the machined surface failure detection portion 35 detects the failures on the machined surface and the locations thereof from the characteristic amount of streaks and stripes on the machined surface in the image data.

On the other hand, when the machined surface measurement device 20 is an optical microscope, a laser microscope or a three-dimensional coordinate measurement machine, the machined surface measurement data is position data (coordinate data). In this case, the machined surface failure detection portion 35 detects the failures on the machined surface and the locations thereof from a small variation (such as vibrations) in the position of the machined surface in the position data (coordinate data).

Then, in step S15, as shown in FIG. 5, the failure location control data identification portion 36 identifies, based on the speed control data (the first work shape image W1) and the machined surface measurement data (the second work shape image W2) associated by the data-associating processing portion 34, the speed control data of a failure location D1 corresponding to the machined surface measurement data of a failure location D2 detected by the machined surface failure detection portion 35.

The failure location control data identification portion 36 also associates the direction of the machined surface failures (streaks or stripes) and the direction of the machining based on the chronological control data of the failure locations with each other.

Then, in step S16, as shown in FIGS. 6A and 6B, the failure interval detection portion 37 detects the interval d of the failures (streaks or stripes) on the machined surface of the work W detected by the machined surface failure detection portion 35.

Then, in step S17, the vibration frequency calculation portion 38 determines the speed v in the direction of the machining based on the speed control data of the failure locations identified by the failure location control data identification portion 36. Then, the vibration frequency calculation portion 38 calculates, based on the determined speed v and the interval d of the failures (streaks or stripes) detected by the failure interval detection portion 37, by formula (1) below, the frequency f of the vibrations of the machine tool 10 that cause the failures.

$$f = v/d \quad (1)$$

Then, in step S18, the adjustment portion 39 adjusts, based on the frequency of the vibrations calculated by the vibration frequency calculation portion 38, the filter or the machining condition of the numerical control device 17 so as to reduce the vibrations. For example, the adjustment portion 39 adjusts the cutoff frequency of the filter (for example, a low-pass filter, a high-pass filter, or a band-pass filter) of the control loop formed with the position command generation portion, the speed command generation portion and the torque command generation portion in the numerical control device 17, and thereby decreases the gain at the frequency of the vibrations.

Alternatively, the adjustment portion 39 sets a filter (for example, a notch filter or a band stop filter) in the control loop of the numerical control device 17. For example, when the numerical control device 17 is realized by software, the filter can be automatically generated.

Alternatively, the adjustment portion 39 adjusts the machining condition (the speed, the acceleration or the jerk) of the numerical control device 17 such that the machining speed is low. For example, the adjustment portion 39 changes, based on the set value of the machining program, a parameter for determining the speed, the acceleration, or the jerk of the drive axes.

Here, the failures (streaks or stripes) caused by the vibrations occur in the direction intersecting the direction of the machining. For example, the failures (streaks or stripes) caused by the vibrations may occur in the direction perpendicular to the direction of the machining as shown in FIG. 7A or may occur in the direction obliquely intersecting the direction of the machining as shown in FIG. 7B. The failures (streaks or stripes) caused by the vibrations may occur linearly as shown in FIGS. 7A and 7B or may occur in the shape of curves as shown in FIG. 7C.

Thus, the adjustment portion 39 performs, based on the direction of the machined surface failures (streaks or stripes) associated by the failure location control data identification portion 36 and the direction of the machining, the adjustment processing described above when the direction of the machined surface failures (streaks or stripes) intersects the direction of the machining. When the direction of the machined surface failures (streaks or stripes) is parallel to the direction of the machining, the failures are not caused by the vibrations, with the result that the adjustment portion 39 does not perform the adjustment processing described above.

As described above, in the numerical control system 100 of the machine tool according to the present embodiment, the machined surface failure analysis device 30 associates the chronological speed control data at the time of the machining of the work and the spatial work machined surface measurement data after the machining of the work with each other, and thereby identifies the speed control data of the failure locations corresponding to the work machined surface measurement data of the machined surface failure locations in the work W. Then, the machined surface failure analysis device 30 calculates the frequency of the vibrations based on the machining speed based on the identified speed control data of the failure locations and the interval of the failures (streaks or stripes). In this way, based on the interval of the failures (streaks or stripes) on the machined surface of the work and the machining speed when the failures occur, the frequency of the vibrations can be estimated, and even in machining where machining speed varies while the work is being machined, the frequency of the vibrations of the machine tool 10 that cause the failures on the machined surface of the work can be estimated accurately.

In the numerical control system 100 of the machine tool of the present embodiment, the machined surface failure analysis device 30 adjusts, based on the frequency of the vibrations calculated, the filter characteristic or the machining condition (the speed, the acceleration or the jerk) of the numerical control device 17 so as to reduce the vibrations. In this way, it is possible to enhance the quality of the machined surface at the time of the subsequent rounds of machining.

Although the embodiment of the present invention is described above, the present invention is not limited to the embodiment described above. The effects described in the present embodiment are simply those which are obtained by listing the most preferred effects produced from the present invention, and thus the effects of the present invention are not limited to those described in the present embodiment.

For example, in the embodiment described above, in order to identify the speed control data corresponding to the machined surface measurement data of the failure locations, the data-associating processing portion 34 of the machined surface failure analysis device 30 directly associates the speed control data itself from the numerical control device 17 and the machined surface measurement data from the machined surface measurement device 20 with each other. However, the data-associating processing portion 34 may indirectly associate position control data from the numerical control device 17 and the machined surface measurement data with each other, identify the position control data corresponding to the machined surface measurement data of the failure locations, and identify the speed control data corresponding to the position control data. In this case, the drive axis control data acquisition portion 31 and the data-associating processing portion 34 on the machined surface failure analysis device 30 may be functioned and operated as follows.

The drive axis control data acquisition portion 31 acquires, from the numerical control device 17, as the chronological drive axis control data when the work W is machined, the speed control data (speed command values, speed feedback values) and the position control data (position command values, position feedback values), and stores them in the storage portion 33 (step S11 of FIG. 3).

The data-associating processing portion 34 associates the chronological position control data stored in the storage portion 33 and the spatial machined surface measurement data with each other (step S13 of FIG. 3). Specifically, the data-associating processing portion 34 first converts the machined surface measurement data into machine coordinate data. For example, when the machined surface measurement device 20 is a vision sensor, the machined surface measurement data is image data. In this case, the data-associating processing portion 34 uses an image processing technology so as to determine the coordinate data of the work W from the image data. Then, the data-associating processing portion 34 converts the coordinate data of the work W into the machine coordinate data based on a distance between the machined surface measurement device 20 and the work W and the position (machine coordinates) and the angle (angle of view) of the machined surface measurement device 20.

On the other hand, when the machined surface measurement device 20 is an optical microscope, a laser microscope or a three-dimensional coordinate measurement machine, the machined surface measurement data is position data (coordinate data). In this case, the data-associating processing portion 34 converts the position data (coordinate data) of the work W into the machine coordinate data based on the distance between the machined surface measurement device 20 and the work W and the position (machine coordinates) and the angle (angle of view) of the machined surface measurement device 20.

Then, the data-associating processing portion 34 associates the chronological position control data (machine coordinates) when the work W is machined and the spatial position data (machine coordinates) of the machined surface after the machining of the work W with each other. For example, as shown in FIG. 4, the data-associating processing portion 34 produces the first work shape image W1 based on the chronological position control data (machine coordinates) when the work W is machined. Likewise, the data-associating processing portion 34 produces the second work shape image W2 based on the spatial position data (machine coordinates) of the machined surface after the machining of the work W. Then, the data-associating processing portion 34 associates the chronological position control data and the spatial position data of the machined surface with each other so as to superimpose the first work shape image W1 and the second work shape image W2 on each other.

Here, in the numerical control device 17, the speed control data and the position control data are associated with each other. In this way, the data-associating processing portion 34 associates the chronological speed control data stored in the storage portion 33 and the position control data with each other so as to associate the chronological speed control data and the spatial position data of the machined surface with each other.

In the embodiment described above, the data-associating processing portion 34 may indirectly associate torque control data from the numerical control device 17 and the machined surface measurement data with each other, identify the torque control data corresponding to the machined surface measurement data of the failure locations, and identify the speed control data corresponding to the torque control data. In this case, as with the case of the speed control data described above, based on the point of a variation in the torque control data, the torque control data corresponding to the machined surface measurement data of the failure locations may be identified.

Although in the embodiment described above, the machined surface failure detection portion 35 of the machined surface failure analysis device 30 automatically detects the failures on the machined surface and the locations thereof from the image data or the position data (coordinate data) of the work W (the machined surface) from the machined surface measurement device 20, they may be detected manually. For example, the measurement result (three-dimensional image data or position data) of the machined surface measurement device 20 may be displayed on a monitor or the like, the failures and the locations thereof may be visually detected by a user and the detected failure locations may be manually input to the machined surface failure analysis device 30.

Although in the embodiment described above, the failure interval detection portion 37 of the machined surface failure analysis device 30 automatically detects the interval of the failures (streaks or stripes) on the machined surface of the work W, it may be detected manually. For example, the measurement result (three-dimensional image data or position data) of the machined surface measurement device 20 may be displayed on a monitor or the like, the interval of the failures (streaks or stripes) may be visually detected by the user and the interval of the failures (streaks or stripes) detected may be manually input to the machined surface failure analysis device 30.

EXPLANATION OF REFERENCE NUMERALS 2 head
3 support member
4 support column
5 base
6 table
10 machine tool
11 to 15 encoder
16 scale
17 numerical control device (control device)
20 machined surface measurement device
30 machined surface failure analysis device (analysis device)
31 drive axis control data acquisition portion (first acquisition portion)
32 machined surface measurement data acquisition portion (second acquisition portion)
33 storage portion
34 data-associating processing portion
35 machined surface failure detection portion
36 failure location control data identification portion (identification portion)
37 failure interval detection portion
38 vibration frequency calculation portion (calculation portion)
39 adjustment portion (adjustment portion, setting portion)
100 numerical control system (control system)
CT1 to CT5 current detector
M1 to M5 servomotor
T tool
W work

What is claimed is:

1. A control system of a machine tool which machines a work, the control system comprising:
a control device which controls a drive axis of the machine tool based on speed control data;
a machined surface measurement device which measures a machined surface of the work; and
an analysis device which analyzes failures on the machined surface of the work,
wherein the analysis device includes:
a first acquisition portion which acquires, from the control device, the chronological speed control data when the work is machined;
a second acquisition portion which acquires spatial machined surface measurement data after the machining of the work measured by the machined surface measurement device;
a data-associating processing portion which associates the chronological speed control data acquired by the first acquisition portion and the spatial machined surface measurement data acquired by the second acquisition portion with each other;
a machined surface failure detection portion which detects the failures on the machined surface of the work and the locations thereof based on the spatial machined surface measurement data acquired by the second acquisition portion;

an identification portion which identifies, based on the speed control data and the machined surface measurement data associated by the data-associating processing portion, the speed control data of the failure locations corresponding to the machined surface measurement data of the failure locations detected by the machined surface failure detection portion;

a failure interval detection portion which detects an interval of the failures detected by the machined surface failure detection portion;

a calculation portion which determines a speed in a direction of the machining based on the speed control data of the failure locations identified by the identification portion and which calculates, based on the determined speed and the interval of the failures detected by the failure interval detection portion, a frequency of vibrations of the machine tool that cause the failures; and an adjustment portion which adjusts, based on the frequency of the vibrations calculated by the calculation portion, a filter or a machining condition of the control device so as to reduce the vibrations.

2. The control system of the machine tool according to claim 1, wherein the data-associating processing portion:

detects, based on a variation in the chronological speed control data, as an edge position of the work, a machining start position and a machining completion position so as to produce a first work shape image;

detects, based on the spatial machined surface measurement data, an edge position of the work so as to produce a second work shape image; and associates the chronological speed control data and the spatial machined surface measurement data with each other so as to superimpose the edge position of the first work shape image and the edge position of the second work shape image on each other.

3. The control system of the machine tool according to claim 1, wherein the data-associating processing portion:

detects, based on a variation in a value obtained by subtracting an acceleration/deceleration variation part from the chronological speed control data, as an edge position of the work, a machining start position and a machining completion position so as to produce a first work shape image;

detects, based on the spatial machined surface measurement data, an edge position of the work so as to produce a second work shape image; and associates the chronological speed control data and the spatial machined surface measurement data with each other so as to superimpose the edge position of the first work shape image and the edge position of the second work shape image on each other.

4. The control system of the machine tool according to claim 1, wherein the first acquisition portion acquires, from the control device, position information of the drive axis of the machine tool which is chronological position control data associated with the chronological speed control data when the work is machined, and the data-associating processing portion:
produces a first work shape image based on the chronological position control data;
produces a second work shape image based on the spatial machined surface measurement data;
associates the chronological position control data and the spatial machined surface measurement data with each other so as to superimpose the first work shape image and the second work shape image on each other; and
associates the chronological speed control data and the chronological position control data with each other so as to associate the chronological speed control data and the spatial machined surface measurement data with each other.

5. The control system of the machine tool according to claim 4, wherein the chronological position control data is machine coordinate information, and the spatial machined surface measurement data is machine coordinate information which is calculated based on a machine coordinate of the machined surface measurement device.

6. The control system of the machine tool according to claim 1, wherein the adjustment portion adjusts a characteristic of the filter in a control loop of the control device or sets the filter in the control loop of the control device.

7. The control system of the machine tool according to claim 1, wherein the adjustment portion adjusts a parameter for determining a speed, an acceleration or a jerk of the drive axis in the control device so as to adjust the machining condition.

8. The control system of the machine tool according to claim 1, wherein the failures on the machined surface of the work are streaks or stripes.

9. The control system of the machine tool according to claim 1, wherein the speed control data is a speed command value or a speed feedback value.

* * * * *